United States Patent
Lee et al.

(10) Patent No.: US 8,512,672 B2
(45) Date of Patent: Aug. 20, 2013

(54) FABRICATION METHOD OF ZNO NANO-PARTICLE AND FABRICATION METHOD OF ZNO NANO-FLUID USING THEREOF

(75) Inventors: Hyo-sook Lee, Daejeon (KR); Yong Jae Suh, Daejeon (KR); Dae Sup Kil, Daejeon (KR); Kuk Cho, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 256 days.

(21) Appl. No.: 12/862,384

(22) Filed: Aug. 24, 2010

(65) Prior Publication Data

US 2011/0049415 A1  Mar. 3, 2011

(30) Foreign Application Priority Data

Aug. 25, 2009  (KR) ........................ 10-2009-0078701

(51) Int. Cl.
  *C01G 9/02* (2006.01)
(52) U.S. Cl.
  USPC ......................................... 423/622; 977/774
(58) Field of Classification Search
  USPC .................................. 423/622; 977/773–775
  See application file for complete search history.

(56) References Cited

U.S. PATENT DOCUMENTS 6,710,091 B1 * 3/2004 Womelsdorf et al. ............ 516/33

FOREIGN PATENT DOCUMENTS

| KR | 1020070096505 A | 10/2007 |
| KR | 1020080038625 A | 5/2008 |

OTHER PUBLICATIONS

Hydrothermal Synthesis of ZnO Nanorods in the Diameter Regime of 50 nm Bin Liu and and Hua Chun Zeng* Journal of the American Chemical Society 2003 125 (15), 4430-4431.*

Chung-Hsin Lu, Chi-Hsien Yeh, Influence of hydrothermal conditions on the morphology and particle size of zinc oxide powder, Ceramics International, vol. 26, Issue 4, May 1, 2000, pp. 351-357, ISSN 0272-8842, 10.1016/S0272-8842(99)00063-2. (http://www.sciencedirect.com/science/article/pii/S0272884299000632).*

Mihaela Jitianu, Dan V. Goia, Zinc oxide colloids with controlled size, shape, and structure, Journal of Colloid and Interface Science, vol. 309, Issue 1, May 1, 2007, pp. 78-85, ISSN 0021-9797, 10.1016/j.jcis.2006.12.020. (http://www.sciencedirect.com/science/article/pii/S0021979706011441).*

Alessio Becheri, Maximilian Dürr, Pierandrea Lo Nostro and Piero Baglioni. "Synthesis and characterization of zinc oxide nanoparticles: application to textiles as UV-absorbers" Journal of Nanoparticle Research vol. 10, No. 4 (2008), 679-689, DOI: 10.1007/s11051-007-9318-3.*

* cited by examiner

*Primary Examiner* — Stanley Silverman
*Assistant Examiner* — Richard M Rump
(74) *Attorney, Agent, or Firm* — The Webb Law Firm

(57) ABSTRACT

Provided are a method for preparing zinc oxide (ZnO) nanoparticles and a method for preparing ZnO nanofluid using the same. The method for preparing ZnO nanoparticles includes: a) heating deionized water; b) dissolving zinc (Zn) salt in the deionized water to prepare a precursor solution; c) adding solid alkali salt to the precursor solution to prepare a dispersion of ZnO nanoparticles; and d) separating the ZnO nanoparticles by solid-liquid separation and washing them with deionized water. Highly pure, crystalline ZnO nanoparticles with spherical shape and very narrow particle size distribution of 10 to 50 nm can be prepared quickly and at large scale and low cost using inexpensive materials via a stable low-temperature process, without using a dispersant. The associated low-temperature, normal-pressure process produces few harmful materials and may be easily employed for production of ZnO nanoparticles.

4 Claims, 4 Drawing Sheets

FABRICATION METHOD OF ZNO NANO-PARTICLE AND FABRICATION METHOD OF ZNO NANO-FLUID USING THEREOF

CROSS-REFERENCE TO RELATED APPLICATIONS

This application claims priority under 35 U.S.C. §119 to Korean Patent Application No. 10-2009-0078701, filed on Aug. 25, 2009, in the Korean Intellectual Property Office, the disclosure of which is incorporated herein by reference in its entirety.

TECHNICAL FIELD

The following disclosure relates to a method for preparing zinc oxide (ZnO) nanoparticles by adding an alkali salt to a Zn salt solution, and a method for preparing ZnO nanofluids using the same.

More particularly, the following disclosure relates to a method capable of producing ZnO nanoparticles having spherical shape and narrow particle size distribution of 10 to 50 nm in short time via a low-temperature, normal-pressure process without using any additives for particle size control such as a dispersant.

BACKGROUND

Zinc oxide (ZnO) nanoparticles have been traditionally used to block sunlight in a wide spectrum range. Due to superior semiconducting property with a very large band gap energy, as well as biocompatibility, piezoelectricity, fluorescence and optical conductivity, applications in various fields, including solar devices, biochips, gas sensors, catalysts and electronic devices, are expected.

ZnO nanoparticles are prepared by a gas phase synthesis process wherein gaseous Zn is reacted with oxygen, by a coprecipitation process wherein a Zn precursor is dissolved in water, precipitated as zinc carbonate, and then heat-treated to obtain ZnO nanoparticles, or by a solution process wherein a Zn precursor is dissolved and then an alkali salt solution is added to obtain ZnO precipitate.

The gas phase synthesis process is disadvantageous in that control of ZnO particle size is difficult, preparation of ZnO particles having size of tens of nanometers is difficult, and process and facility to conduct the relevant gas phase reaction at high temperature are complicated. Thus, it is not suited for large-scale production.

The coprecipitation process is disadvantageous in that, since ZnO is prepared by heat treatment, ZnO aggregates produced by sintering during the heat treatment should be pulverized by a post-treatment process. Also, it is difficult to prepare ZnO nanoparticle with uniform shape and narrow particle size distribution of tens of nanometers.

The solution process requires addition of a dispersant to control the size of ZnO nanoparticles. Even when the dispersant or other additive is used, ZnO particles of an order of hundreds of nanometers are prepared, and needle-shaped particles are obtained rather than spherical ones. Further, an expensive organozinc compound is used as a Zn precursor. Although the synthesis proceeds at relatively low temperature (300° C. or lower) as compared to the gas phase synthesis or coprecipitation process, a long time is required until the reaction is completed.

Zinc oxide (ZnO) nanofluid wherein ZnO nanoparticles are dispersed in a fluid has very high thermal conductivity as compared to a fluid without containing the nanoparticles. Hence, researches are increasing for utilizing the property with industrial purposes. The nanofluid having improved thermal conductivity may be used to improve thermal efficiency of heat exchangers, automobile engines, or the like, and therefore is widely applicable in the fields of electricity, electronics, machinery and others.

The technical problems in the preparation of nanofluid are how to keep the fluid stably dispersed for a long period of time and how to produce the nanofluid with good dispersion stability in large scale via a simple process.

At present, commercially available nanoparticles are mixed with a medium such as water or alcohol, dispersed for 30 to 40 hours using ultrasonic wave, and then mixed for 30 to 40 hours after adding a solution of benzonite, phosphate, nitrate, etc. in ethylene glycol to prepare nanofluid (Korean Patent Publication No. 2007-0096505), or commercially available nanoparticles are dispersed in liquid solvent, physically pulverized using a bead mill or high-pressure homogenizer, surface-modified, passed through an ultrafiltration membrane, and then dispersed in oil after removing water to prepare nanofluid (Korean Patent Publication No. 2008-0038625).

However, these processes are disadvantageous since each step of the processes requires a long time of 30 to 40 hours or the process of pulverization, high-pressure homogenization or filtration is complicated and requires expensive equipments, which makes them inapplicable to large-scale production. Further, a new preparation process has to be designed for a different dispersion medium.

SUMMARY

An embodiment of the present invention is directed to providing a method for preparing zinc oxide (ZnO) nanoparticles of an order of tens of nanometers without using a dispersant, to providing a method for preparing ZnO nanoparticles having spherical shape, to providing a method for preparing ZnO nanoparticles having narrow particle size distribution, and to providing a method for preparing ZnO nanoparticles in short time via a low-temperature, normal-pressure process using inexpensive materials.

Another embodiment of the present invention is directed to providing a method for preparing nanofluid having high thermal conductivity, specifically ZnO nanofluid wherein ZnO nanoparticles are dispersed, to providing a method for preparing ZnO nanofluid via a single process, to providing a method for preparing ZnO nanofluid stably dispersed in various media, and to providing a method for preparing ZnO nanofluid enabling large-scale production with a simple low-temperature, normal-pressure process.

The major factors enabling the preparation of spherical ZnO nanoparticles, the preparation of highly pure ZnO nanoparticles without generation of other phases, and the preparation of uniform ZnO nanoparticles of an order of tens of nanometers without using a dispersant are pH during preparation of ZnO, conditions of addition of alkali salt, and states of solvent for preparation of Zn precursor.

In one general aspect, a method for preparing ZnO nanoparticles includes: a) heating deionized water; b) dissolving Zn salt in the deionized water to prepare a precursor solution; c) adding solid alkali salt to the precursor solution to prepare a dispersion of ZnO nanoparticles; and d) separating the ZnO nanoparticles by solid-liquid separation and washing them with deionized water.

The steps a) to c) may be performed in the state where the solvent deionized water is heated. Specifically, each of the steps a), b) and c) may be performed at 95 to 100° C.

The pH of the dispersion of ZnO nanoparticles prepared in the step c) may be 7 to 8. Specifically, in the step c), the addition amount of the solid alkali salt is determined to adjust the pH of the dispersion of ZnO nanoparticles to 7 to 8. As a result of the addition of the solid alkali salt to the precursor solution, ZnO nanoparticles are produced at pH 7 to 8.

The solid alkali salt added in the step c) may be a solid alkali salt pellet which is in the form of a compressed aggregate or a melt-solidified powder.

Specifically, the alkali salt added in the step c) may be a single alkali salt pellet.

Specifically, the alkali salt may be a pellet satisfying Inequality (1), and the step c) may be performed by adding a plurality of the pellets at once so that the pH of the dispersion of ZnO nanoparticles is 7 to 8:

$$0.002 \times V_{sol} \leq V_{pell} \leq 0.004 \times V_{sol} \quad (1)$$

wherein $V_{sol}$ is the volume of the deionized water in the step a), and $V_{pell}$ is the volume of the pellet.

The precursor solution in the step b) may have a Zn ion concentration of 200 to 300 mM. The step c) may be accompanied by agitation, which may be performed at 50 to 300 rpm.

The Zn salt may be zinc halide, specifically zinc chloride, and the alkali salt may be sodium hydroxide.

The separation and washing in the step d) may be performed once or more times, preferably 2 to 4 times, with agitation of the ZnO nanoparticles in deionized water and solid-liquid separation using a centrifuge as a unit process.

The ZnO nanoparticles prepared by the preparation method are spherical wurtzite (hexagonal crystal system, $P6_3mc$ space group) crystalline zinc oxide (ZnO) nanoparticles and have an average particle size of 10 to 50 nm.

In another general aspect, a ZnO nanofluid (I) wherein the ZnO nanoparticles are dispersed in a water-based medium such as water, ethylene glycol or antifreeze or a ZnO nanofluid (II) wherein the ZnO nanoparticles are dispersed in an oil-based medium such as kerosene, mineral oil or transformer oil is prepared.

The ZnO nanofluid (I) is prepared by adding deionized water or ethylene glycol to the ZnO nanoparticles prepared by the aforementioned method so that the content of the ZnO nanoparticles is 0.1 to 10 vol % and then by dispersing the mixture using ultrasonic wave.

The ZnO nanofluid (II) is prepared by a process including: e) adding deionized water to the ZnO nanoparticles prepared by the method according to any one of claims 1 to 8 and adjusting pH to 9 to 11; f) adding a lipophilic dispersant to the pH-adjusted deionized water to prepare a lipophilic dispersion of ZnO nanoparticles wherein the ZnO nanoparticles are coated with the lipophilic dispersant; g) adjusting the pH of the lipophilic dispersion of ZnO nanoparticles to 3 to 7 so that the lipophilic ZnO nanoparticles are separated from a liquid phase, and recovering the separated lipophilic ZnO nanoparticles; and h) washing the recovered lipophilic ZnO nanoparticles using a polar solvent by means of solid-liquid separation, adding oil to the washed lipophilic ZnO nanoparticle, and then performing ultrasonic dispersion.

The lipophilic dispersant in the step f) maybe a $C_{12}$-$C_{18}$ organic fatty acid, and the $C_{12}$-$C_{18}$ organic fatty acid may be oleic acid, lauric acid, an organic fatty acid having a $C_{12}$-$C_{18}$ alkyl chain, or a mixture thereof.

In the step f), after the addition of the lipophilic dispersant, themixturemaybeheatedto 90 to 100° C. so that the lipophilic dispersant is coated on the ZnO nanoparticles.

In the step h), the oil may be added in such an amount that the content of the washed lipophilic ZnO nanoparticles is 0.1 to 10 vol %.

The oil may be kerosene, mineral oil, transformer oil or a mixture thereof, and the polar solvent used in the step h) may be deionized water, ethanol, acetone or a mixture thereof.

The washing in the step h) may be performed once or more times, preferably 2 to 4 times, with agitation of the lipophilic ZnO nanoparticles in a polar solvent and solid-liquid separation of the lipophilic ZnO nanoparticles as a unit process. If the washing is performed two or more times, different polar solvents may be used.

The method for preparing ZnO nanoparticles according to the present invention is advantageous in that ZnO nanoparticles having spherical shape and very narrow particle size distribution of 10 to 50 nm can be prepared in high purity and in short time via a stable low-temperature process, at very low cost using inexpensive materials. Further, the associated low-temperature, normal-pressure process produces few harmful materials andmaybe easily employed for production of ZnO nanoparticles.

The method for preparing ZnO nanofluid according to the present invention is advantageous in that a nanofluid with improved thermal conductivity wherein ZnO nanoparticles are stably dispersed in various dispersion media can be prepared via a very simple single process. Further, effective large-scale production is possible because no complicated facilities are required and production cost is very low.

Further, the method for preparing ZnO nanofluid according to the present invention is advantageous in that it provides a nanofluid with improved thermal conductivity as compared to a general cooling fluid, which provides excellent cooling effect when used to cool heat-producing equipments and thereby improves energy efficiency.

Other features and aspects will be apparent from the following detailed description, the drawings, and the claims.

DETAILED DESCRIPTION OF EMBODIMENTS

The advantages features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
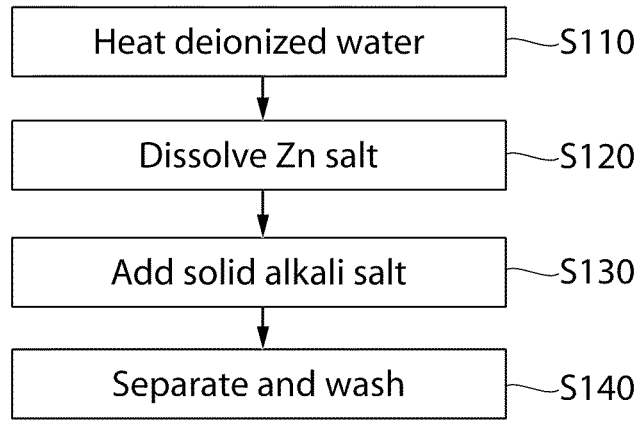
FIG. 1 illustrates a process of a method for preparing zinc oxide (ZnO) nanoparticles according to an exemplary embodiment of the present invention.

FIG. 1 illustrates a process of a method for preparing zinc oxide (ZnO) nanoparticles according to an exemplary embodiment of the present invention. As seen in FIG. 1, a preparation method according to an exemplary embodiment of the present invention comprises: heating deionized water (S110); dissolving Zn salt in the heated deionized water to prepare a precursor solution (S120); adding solid alkali salt to the precursor solution to prepare a dispersion of ZnO nanoparticles (S130); and separating the ZnO nanoparticles by solid-liquid separation and washing them with deionized water (S140).

In the present invention, the precursor solution is prepared using heated deionized water in order to prevent generation of other phases in preparation for pure ZnO nanoparticles. Specifically, in operation S110, the deionized water is heated to 95 to 100° C., preferably 100° C. (boiling temperature).

After the deionized water is heated to 95 to 100° C., Zn salt, which is a Zn precursor, is added to the heated deionized water to prepare the precursor solution. Specifically, the precursor solution may be prepared by adding the Zn salt to the deionized water heated at 95 to 100° C. and dissolving the Zn salt by agitation in order to obtain the precursor solution at 95 to 100° C. Preferably, the precursor solution has a Zn ion concentration of 200 to 300 mM. The concentration is adequate to prevent generation of other phases in preparation for ZnO nanoparticles with uniform size and shape. The Zn salt may be zinc halide, preferably zinc chloride.

Subsequently, in order to prevent generation of other phases in preparation for ZnO nanoparticles with narrow particle size distribution of an order of tens of nanometers, the alkali salt in solid state, not in solution state, is added to the precursor solution. While the solid alkali salt is added and the dispersion of ZnO nanoparticles is prepared in operation S130, the temperature is maintained at 95 to 100° C.

It is preferred that the solid alkali salt is added immediately after the Zn salt is completely dissolved and the precursor solution is prepared. Preferably, the solid alkali salt is added under an agitation at 50 to 300 rpm.

The solid alkali salt may be an alkali salt pellet. Considering scale-up for large-scale production, one or more alkali salt pellet(s) satisfying Inequality (1) may be added at once to the precursor solution at 95 to 100° C.:

$$0.002 \times V_{sol} \leq V_{pell} \leq 0.004 \times V_{sol} \qquad (1)$$

wherein $V_{sol}$ is the volume of the deionized water in operation S110, and $V_{pell}$ is the volume of the pellet.

In order to prepare spherical ZnO nanoparticles, not needle-shaped ones, the alkali salt may be added to the dispersion of ZnO nanoparticles such that the pH of the dispersion of ZnO nanoparticles is 7 to 8. Specifically, as the solid alkali salt is added to the precursor solution, ZnO nanoparticles are produced at pH 7 to 8. Preferably, the alkali salt is sodium hydroxide.

Then, the ZnO nanoparticles are recovered from the dispersion of ZnO nanoparticles obtained in operation S130 by means of solid-liquid separation. Preferably, the solid-liquid separation to recover the ZnO nanoparticles is performed using a centrifuge.

The recovered ZnO nanoparticles may be separated and washed once or more times, preferably 2 to 4 times, with agitation of the ZnO nanoparticles in deionized water and solid-liquid separation using a centrifuge as a unit process. As a result of the separation and washing in operation S140, the ZnO nanoparticles according to the present invention are prepared.

Hereinafter, a method for preparing ZnO nanofluid (I) using the method for preparing ZnO nanoparticles according to the present invention will be described.

In the method for preparing ZnO nanofluid (I) according to the present invention, deionized water or ethylene glycol is added to the ZnO nanoparticles prepared above so that the content of the ZnO nanoparticles is 0.1 to 10 vol %, and then ultrasonic dispersion is performed.

Figure 2:
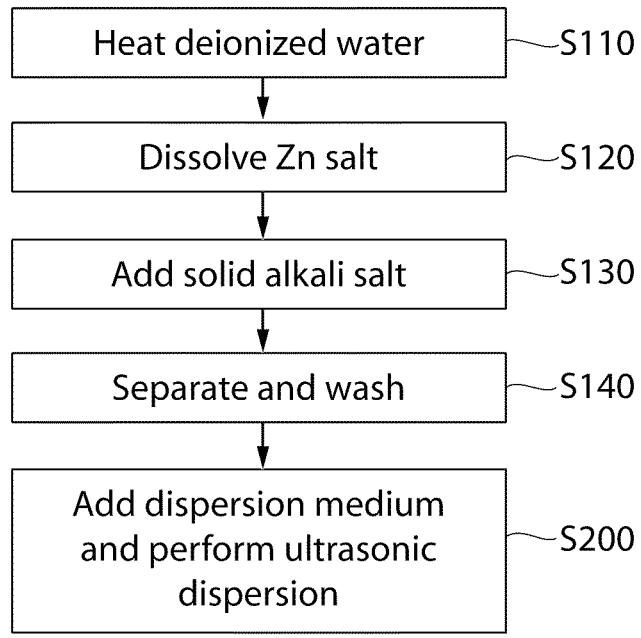
FIG. 2 illustrates a process of a method for preparing ZnO nanofluid (I) according to an exemplary embodiment of the present invention.

Specifically, as seen in FIG. 2, the method for preparing ZnO nanofluid (I) according to the present invention comprises: heating deionized water (S110); dissolving Zn salt in the heated deionized water to prepare a precursor solution (S120); adding solid alkali salt to the precursor solution to prepare a dispersion of ZnO nanoparticles (S130); separating the ZnO nanoparticles by solid-liquid separation and washing them with deionized water (S140); and adding deionized water or ethylene glycol to the washed ZnO nanoparticles so that the content of the ZnO nanoparticles is 0.1 to 10 vol % and performing ultrasonic dispersion (S200). Preferably, the ultrasonic dispersion to disperse the ZnO nanoparticles in deionized water or ethylene glycol may be performed by applying ultrasonic wave for 5 to 30 minutes.

Since operations S110 to S140 are similar in those described in the method for preparing ZnO nanoparticles, description thereof will be omitted.

In order to improve thermal conductivity over deionized water or ethylene glycol, to avoid excessively high viscosity and to maintain high dispersibility, the content of the ZnO nanoparticles in the ZnO nanofluid is maintained at 0.1 to 10 vol %. Preferably, the ZnO nanoparticles prepared in operations S110 to S140 and dispersed in deionized water or ethylene glycol have an average particle size of 10 to 50 nm.

Hereinafter, a method for preparing ZnO nanofluid (II) using the method for preparing ZnO nanoparticles according to the present invention will be described.

In the method for preparing ZnO nanofluid (II) according to the present invention, deionized water is added to the ZnO nanoparticles prepared above, pH is adjusted to 9 to 11, and a lipophilic dispersant is added to the pH-adjusted deionized water to prepare a lipophilic dispersion of ZnO nanoparticles wherein the lipophilic dispersant is coated on the ZnO nanoparticles. Then, the pH of the lipophilic dispersion of ZnO nanoparticles is adjusted to 3 to 7 so that a liquid phase is separated from the lipophilic ZnO nanoparticles, the phase-separated lipophilic ZnO nanoparticles are recovered, the recovered lipophilic ZnO nanoparticles are washed with a polar solvent by means of solid-liquid separation, oil is added to the lipophilic ZnO nanoparticles, and then ultrasonic dispersion is performed to prepare ZnO nanofluid.

Figure 3:
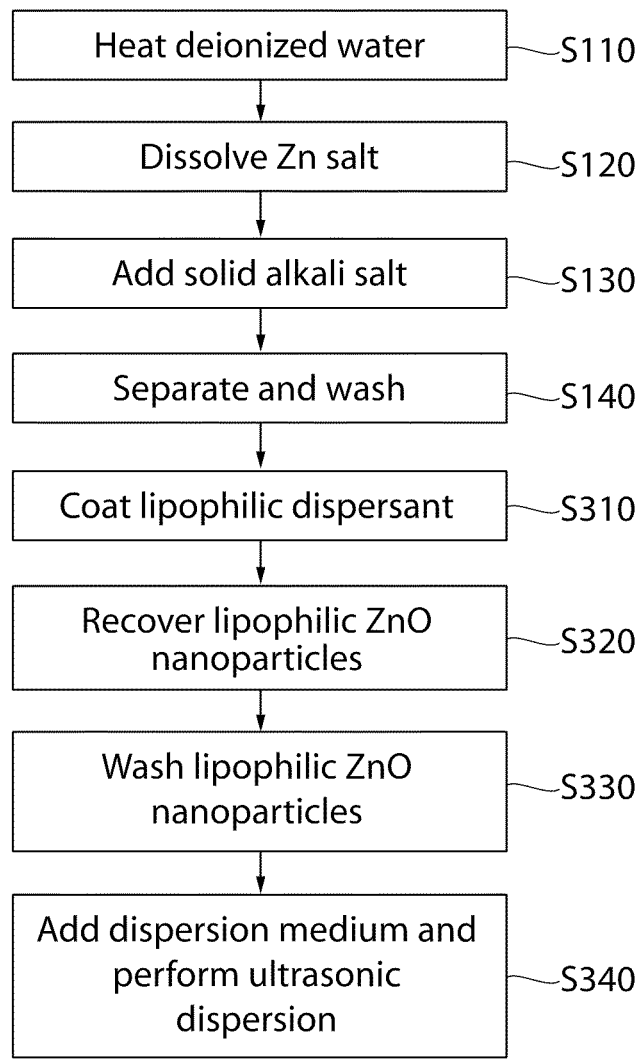
FIG. 3 illustrates a process of a method for preparing ZnO nanofluid (II) according to an exemplary embodiment of the present invention.

Specifically, as seen in FIG. 3, the method for preparing ZnO nanofluid (II) according to the present invention comprises: heating deionized water (S110); dissolving Zn salt in the heated deionized water to prepare a precursor solution (S120); adding solid alkali salt to the precursor solution to prepare a dispersion of ZnO nanoparticles (S130); separating the ZnO nanoparticles by solid-liquid separation and washing them with deionized water by means of solid-liquid separation (S140); adding deionized water to the washed ZnO nanoparticles, adjusting pH to 9 to 11, and adding a lipophilic dispersant to the pH-adjusted deionized water to prepare a lipophilic dispersion of ZnO nanoparticles wherein the lipophilic dispersant is coated on the ZnO nanoparticles (S310); adjusting the pH of the lipophilic dispersion of ZnO nanoparticles to 3 to 7 so that a liquid phase is separated from the lipophilic ZnO nanoparticles, and recovering the phase-separated lipophilic ZnO nanoparticles (S320); washing the recovered lipophilic ZnO nanoparticles with a polar solvent by means of solid-liquid separation (S330); and adding oil to the washed lipophilic ZnO nanoparticles and performing ultrasonic dispersion (S340).

Since operations S110 to S140 are similar in those described in the method for preparing ZnO nanoparticles, description thereof will be omitted.

Figure 4:
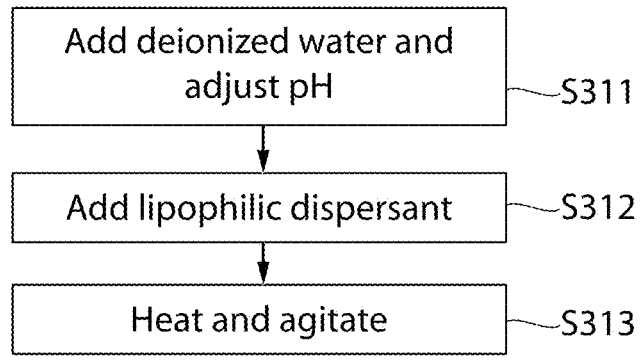
FIG. 4 illustrates a lipophilic dispersant coating process in a method for preparing ZnO nanofluid (II) according to an exemplary embodiment of the present invention.

In operation S310, the ZnO nanoparticles are coated with the lipophilic dispersant since the ZnO nanoparticles are to be dispersed in oil. Specifically, as seen in FIG. 4, the operation S310 is performed by: adding deionized water to the washed ZnO nanoparticle and adjusting the pH of the deionized water to 9 to 11 (S311); adding a lipophilic dispersant to the pH-adjusted deionized water (S312); and heating the pH-adjusted dispersion containing the ZnO nanoparticles and the lipophilic dispersant to 90 to 100° C., preferably under agitation, to prepare a lipophilic dispersion of ZnO nanoparticles wherein the lipophilic dispersant is coated on the ZnO nanoparticles (S313). Preferably, the agitation in operation S313 may be performed for 5 minutes to 2 hours.

Preferably, in operation S311, the pH of the deionized water is adjusted to 9 to 11 by adding ammonia water, sodium hydroxide or a mixture thereof to the deionized water.

Preferably, in operation S312, the lipophilic dispersant is a $C_{12}$-$C_{18}$ organic fatty acid. The $C_{12}$-$C_{18}$ organic fatty acid is preferably oleic acid, lauric acid, an organic fatty acid having a $C_{12}$-$C_{18}$ alkyl chain, or a mixture thereof, more preferably oleic acid, lauric acid, or a mixture thereof. Preferably, the lipophilic dispersant is used in excess so that the dispersant not coated on the ZnO nanoparticle remains after the ZnO nanoparticles are coated.

Subsequently, acidic solution including hydrochloric acid is added to the lipophilic dispersion of ZnO nanoparticles prepared in operation S310 to adjust the pH of the lipophilic dispersion of ZnO nanoparticles to 3 to 7. By the readjustment of pH, the lipophilic ZnO nanoparticles in the lipophilic dispersion of ZnO nanoparticles are separated from a liquid phase, and the phase-separated lipophilic ZnO nanoparticles are recovered.

The recovered lipophilic ZnO nanoparticles are mixed with a polar solvent such as deionized water, acetone, ethanol or a mixture thereof, agitated, and then washed preferably by means of solid-liquid separation using a centrifuge (S330).

Preferably, the washing in operation S330 is performed once or more times, preferably 2 to 4 times, with agitation of the lipophilic ZnO nanoparticles in a polar solvent such as deionized water, acetone, ethanol or a mixture thereof and solid-liquid separation of the lipophilic ZnO nanoparticles using a centrifuge as a unit process.

If the washing is performed two or more times, different polar solvents selected from deionized water, acetone, ethanol and a mixture thereof may be used.

Then, oil is added to the washed lipophilic ZnO nanoparticles and ultrasonic wave is applied for 5 to 30 minutes to prepare ZnO nanofluid (S340). The oil maybe kerosene, mineral oil, transformer oil or a mixture thereof.

In order to improve thermal conductivity over oil, to avoid excessively high viscosity, and to maintain high dispersibility, the content of the ZnO nanoparticles in the ZnO nanofluid (ZnO nanofluid dispersed in oil) is maintained at 0.1 to 10 vol %. Preferably, the ZnO nanoparticles prepared in operations S110 to S140 and dispersed in oil have an average particle size of 10 to 50 nm.

EXAMPLES

The examples and experiments will nowbe described. The following examples and experiments are for illustrative purposes only and not intended to limit the scope of this disclosure.

Preparation of ZnO Nanoparticles

Deionized water (200 mL) was added to a 500 mL flask and heated to 100° C. Then, after adding $ZnCl_2$ (3.407 g, 250 mmol), the mixture was agitated using a magnetic bar to prepare a precursor solution. Immediately after $ZnCl_2$ was completely dissolved, seven 0.5 $cm^3$ sodium hydroxide pellets were added at once and a dispersion of ZnO nanoparticles was prepared by agitating at 100 rpm using a magnetic bar (pH of the dispersion of ZnO nanoparticles=7). As a result of the addition of the sodium hydroxide pellets, ZnO nanoparticles were produced as white precipitate. The reaction was terminated in 10 minutes. During the preparation of the precursor solution and the addition of the sodium hydroxide pellets, the temperature was maintained at 100° C.

After the reaction was terminated, the dispersion of ZnO nanoparticles was cooled to room temperature and ZnO nanoparticles were recovered by centrifuge at 10,000 rpm. The recovered ZnO nanoparticles were mixed with deionized water, agitated, and centrifuged at 10,000 rpm. This washing process was repeated 3 times.

Figure 5:
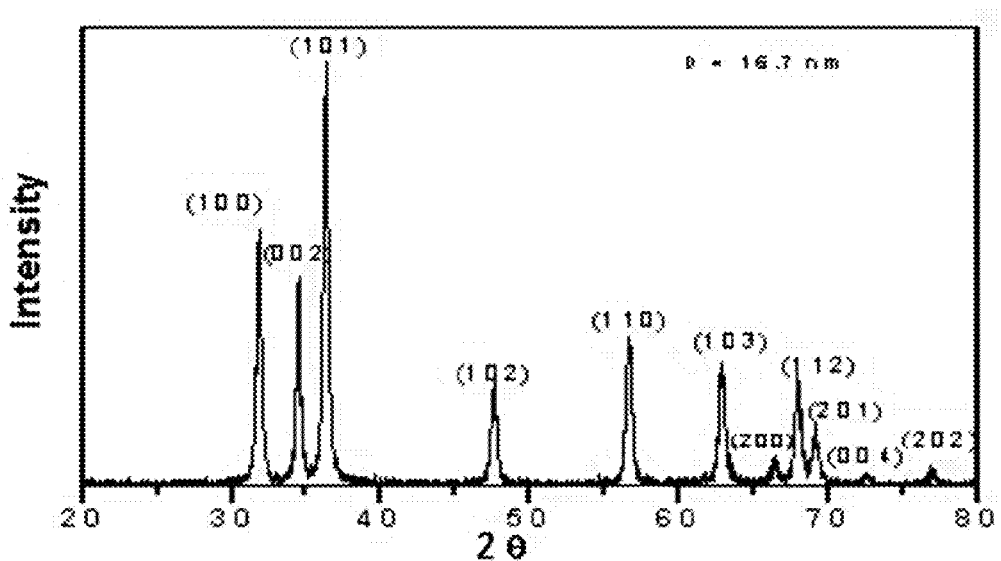
FIG. 5 shows an X-ray diffractogram of ZnO nanoparticles prepared according to an exemplary embodiment of the present invention.

The washed ZnO nanoparticles were washed with acetone and dried for X-ray diffraction and transmission electron microscopic (TEM) observation. FIG. 5 shows an X-ray diffractogram of the prepared ZnO nanoparticles.

As seen in FIG. 5, pure crystalline ZnO nanoparticles were prepared, without generation of other phases. The sharp diffraction peaks show that highly crystalline ZnO nanoparticles were prepared.

Further, FIG. 5 reveals that ZnO nanoparticles having a single wurtzite (hexagonal crystal system, $P6_3mc$ space group) crystal structure were prepared.

Figure 6:
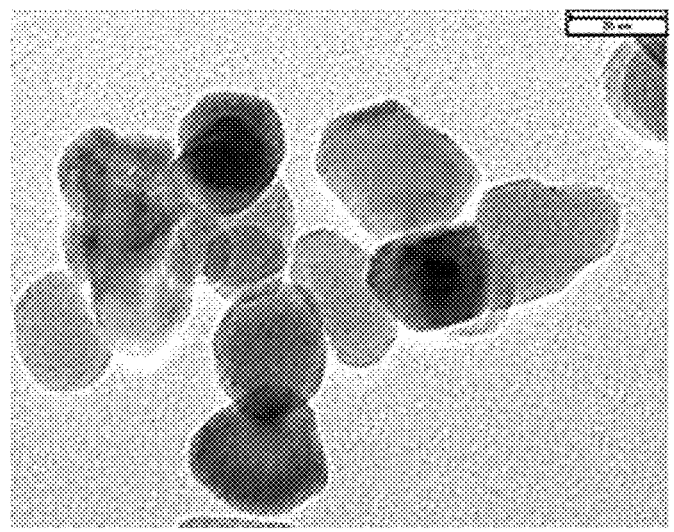
FIG. 6 shows a transmission electron micrograph (TEM) of ZnO nanoparticles prepared according to an exemplary embodiment of the present invention.

FIG. 6 shows a transmission electron micrograph (TEM) of the prepared ZnO nanoparticles. As seen in FIG. 6, spherical, not needle-shaped, ZnO nanoparticles having uniform size of 25 to 30 nm were prepared.

Preparation of Ethylene Glycol-based ZnO Nanofluid

Ethylene glycol (Aldrich, 99.9%) was added to the washed ZnO nanoparticles in the same manner as the preparation of the ZnO nanoparticles. Ethylene glycol was added such that the volume fractions of the ZnO nanoparticles were 0.01, 0.02, 0.03 and 0.04 (1%, 2%, 3% and 4%). After the addition of ethylene glycol, ultrasonic wave of 20 kHz and 200 W was applied for 10 minutes with 10 second periods using an ultrasonic generator (Branson Digital Sonifier Model 450). A ZnO nanofluid wherein ZnO nanoparticles are stably dispersed in ethylene glycol was prepared.

Preparation of Kerosene-based ZnO Nanofluid

Deionized water was added to the washed ZnO nanoparticles in the same manner as the preparation of the ZnO nanoparticles, and sodium hydroxide was added to adjust pH to 11. Then, after adding 15 parts by weight of oleic acid based on 100 parts by weight of the ZnO nanoparticles, the mixture was heated to 95° C. and agitated for 5 minutes to prepare a lipophilic dispersion of oleic acid-coated ZnO nanoparticles.

After cooling to room temperature, 1 mM hydrochloric acid solution was added to the cooled lipophilic dispersion of ZnO nanoparticles to adjust pH to 5. When the ZnO nanoparticles were separated from a liquid phase, the liquid was removed and the lipophilic ZnO nanoparticles were recovered.

After adding deionized water to the recovered lipophilic ZnO nanoparticles, the mixture was agitated and centrifuged at 10,000 rpm. This washing process was performed at least 2 times. Final washing was performed using acetone instead of deionized water.

Kerosene was added to the lipophilic ZnO nanoparticles washed with acetone such that the volume fractions of the ZnO nanoparticles were 0.01, 0.02, 0.03 and 0.04 (1%, 2%, 3% and 4%). After the addition of kerosene, ultrasonic wave of 20 kHz and 200 W was applied for 10 minutes with 10 second periods using an ultrasonic generator (Branson Digital SonifierModel 450). A ZnO nanofluid wherein ZnO nanoparticles are stably dispersed in kerosene was prepared.

Thermal conductivity of thus prepared ethylene glycol-based ZnO nanofluid (hereinafter, nanofluid (I)) and kerosene-based ZnO nanofluid (hereinafter, nanofluid (II)) was measured according to ASTM D2717 using LAMBDA system (F5 Technologie GmbH, Germany, Model LAMBDA).

Figure 7:
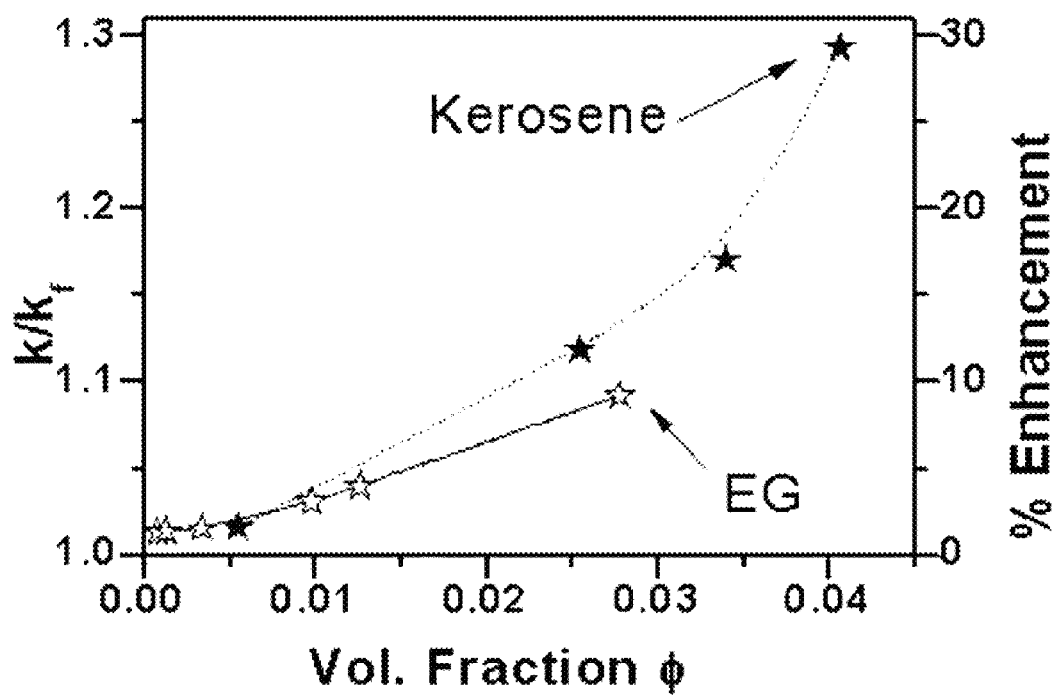
FIG. 7 shows a thermal conductivity measurement result of an ethylene glycol-based ZnO nanofluid (nanofluid (I)) and a kerosene-based ZnO nanofluid (nanofluid (II)) prepared according to an exemplary embodiment of the present invention.

FIG. 7 shows the thermal conductivity measurement results of nanofluid (I) and nanofluid (II). The graph shows the ratio of the thermal conductivity k of each nanofluid to the thermal conductivity $k_f$ of the dispersion medium (ethylene glycol or kerosene) in which the ZnO nanoparticles are dispersed, i.e. $k/k_f$, and the ratio of the increase of thermal conductivity of each nanofluid $(k-k_f)$ to the thermal conductivity $k_f$ of the dispersion medium (ethylene glycol or kerosene) in which the ZnO nanoparticles are dispersed, i.e. $(k-k_f)/k_f$, for different volume fractions of the nanoparticles.

As seen in FIG. 7, the thermal conductivity of nanofluid (I) exhibits increases linearly with the volume fraction. At the volume fraction of 0.028 (2.8 vol %), the thermal conductivity is about 9.2% higher than that of the medium. Further, it can be seen that improvement of the thermal conductivity is more significant at the same ZnO volume fraction when the dispersion medium is kerosene than when ethylene glycol is the medium. The thermal conductivity of nanofluid (II) is about 12% higher than that of the medium at the volume fraction of 0.03 (3 vol %). At the volume fraction of 0.04 (4 vol %), the thermal conductivity is about 29% higher than that of the medium.

While the present invention has been described with respect to the specific embodiments, it will be apparent to those skilled in the art that various changes and modifications may be made without departing from the spirit and scope of the invention as defined in the following claims.

What is claimed is:

1. A method for preparing zinc oxide (ZnO) nanoparticles, comprising:
heating deionized water;
dissolving zinc (Zn) salt in the deionized water to prepare a precursor solution;
adding alkali salt in a solid state to the precursor solution to prepare a dispersion of ZnO nanoparticles; and
separating the ZnO nanoparticles by solid-liquid separation and washing them with deionized water; and
wherein each of said heating, dissolving and adding is performed at 95 to 100° C., and the alkali salt is a pellet satisfying Inequality (1), and said adding the alkali salt is performed by adding a plurality of the pellets at once so that the pH of the dispersion of ZnO nanoparticles is 7 to 8:

$$0.002 \times V_{sol} \leq V_{pell} \leq 0.004 \times V_{sol} \qquad (1)$$

wherein $V_{sol}$ is the volume of the deionized water in said heating, and $V_{pell}$ is the volume of the pellet.

2. The method for preparing ZnO nanoparticles according to claim 1, wherein the precursor solution prepared by said dissolving has a Zn ion concentration of 200 to 300 mM.

3. The method for preparing ZnO nanoparticles according to claim 1, wherein said adding is accompanied by agitation, and the agitation is performed at 50 to 300 rpm.

4. The method for preparing ZnO nanoparticles according to claim 1, wherein the Zn salt is zinc chloride, and the alkali salt is sodium hydroxide.

* * * * *